United States Patent
Hatakeyama (10) Patent No.: US 7,298,560 B2
(45) Date of Patent: Nov. 20, 2007

(54) ZOOM OPTICAL SYSTEM

(75) Inventor: Koshi Hatakeyama, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/222,723

(22) Filed: Sep. 8, 2005

(65) Prior Publication Data

US 2006/0061874 A1 Mar. 23, 2006

(30) Foreign Application Priority Data

Sep. 8, 2004 (JP) ............................. 2004-261718

(51) Int. Cl.
*G02B 15/14* (2006.01)
(52) U.S. Cl. ..................... 359/679; 359/686
(58) Field of Classification Search .................. 359/679
See application file for complete search history.

(56) References Cited

U.S. PATENT DOCUMENTS

| | | | |
|---|---|---|---|
| 5,825,560 A | 10/1998 | Ogura et al. | 359/822 |
| 5,847,887 A | 12/1998 | Ogura et al. | 359/822 |
| 6,021,004 A | 2/2000 | Sekita et al. | 359/676 |
| 6,166,866 A | 12/2000 | Kimura et al. | 359/729 |
| 6,292,309 B1 | 9/2001 | Sekita et al. | 359/729 |
| 6,304,388 B1* | 10/2001 | Shimo | 359/687 |
| 6,366,411 B1 | 4/2002 | Kimura et al. | 359/729 |
| 6,522,475 B2 | 2/2003 | Akiyama et al. | 359/676 |
| 6,639,737 B2* | 10/2003 | Yasui et al. | 359/761 |
| 2005/0036206 A1* | 2/2005 | Wada | 359/676 |

FOREIGN PATENT DOCUMENTS

| | | |
|---|---|---|
| JP | 08-292371 | 11/1996 |
| JP | 08-292372 | 11/1996 |
| JP | 09-005650 | 1/1997 |
| JP | 09-222561 | 8/1997 |
| JP | 2002-055279 | 2/2002 |
| JP | 2002-207167 | 7/2002 |

\* cited by examiner

*Primary Examiner*—Jordan M. Schwartz
(74) *Attorney, Agent, or Firm*—Morgan & Finnegan, LLP (57) ABSTRACT

A zoom optical system includes, in order from the reduction conjugate side to the magnification conjugate side, a first lens unit having a positive optical power; a second lens unit having a negative optical power; a third lens unit having a positive optical power; and a fourth lens unit having a negative optical power, wherein in an entire zoom range, a magnification-side conjugate position relative to a reduction-side conjugate position, and the position of a pupil of the zoom optical system relative to the reduction-side conjugate position are each substantially fixed, and the interval between the first lens unit and the second lens unit at a telephoto end is larger than the interval between the first lens unit and the second tens unit at a wide-angle end.

26 Claims, 8 Drawing Sheets

ZOOM OPTICAL SYSTEM

BACKGROUND OF THE INVENTION

1. Field of the Invention

The present invention relates to a zoom optical system which is used in an optical apparatus such as an image projecting apparatus and an exposure apparatus.

2. Related Background Art

Some of the optical apparatuses described above require a zoom optical system excellent in a telecentric characteristic on the object side and excellent in invariance of the positions of an object surface, an image plane and an exit pupil against variations in the focal length.

For example, Japanese Patent Application Laid-Open No. 2002-207167 discloses a zoom optical system in which a lens unit having a negative refractive power or a lens unit having a lens element having a strong negative refractive power is moved toward the object side as the focal length decreases, whereby the positions of an object surface, an image plane, an entrance pupil and an exit pupil are made invariant against variations in the focal length, as a zoom optical system suitable for an illumination optical system mounted on a projecting exposure apparatus.

It is conceivable that the zoom optical system disclosed in Japanese Patent Application Laid-Open No. 2002-207167 is used for a projecting optical system of an image projecting apparatus projecting on a magnified scale an image of an original formed on a liquid crystal panel, or a part thereof.

However, if the liquid crystal panel is disposed on a reduction-side focal plane of the zoom optical system in Japanese Patent Application Laid-Open No. 2002-207167, a sufficient back focus cannot be obtained because in the zoom optical system, a lens unit in the most magnification side (aperture stop side) has a positive refractive power. In so called a tri-panel type image projecting apparatus, a color synthesizing member synthesizing chromatic light of three colors of red, green and blue is disposed on the reduction side in the zoom optical system, but if a sufficient back focus is not obtained as described above, it is difficult to provide space for displacing the color synthesizing member.

In the zoom optical system disclosed in Japanese Patent Application Laid-Open No. 2002-207167, a lens unit in the most reduction-side has a negative refractive power, and as the focal length decreases, a lens unit disposed in the most magnification side than the negative lens unit moves toward the magnification side, thus increasing the interval between both lens units. As a result, the effective diameter of the positive lens unit increases. Further, because the lens unit in the most reduction side has a negative refractive power, the numerical aperture (NA) on the reduction side decreases.

Japanese Patent Application Laid-Open No. 2002-207167 discloses the case where a lens unit in the most reduction side has a positive refractive power, however this lens unit considerably moves toward the magnification side as the focal length decreases, and therefore if the NA on the reduction side is increased, the effective diameter of the lens unit increases.

Namely, in this zoom optical system, a plurality of lens units are situated in the aperture stop side in a state of the minimum focal length (wide), and move toward the reduction-side focal plane side as the focal length increases, the effective diameter of the lens unit therefore tends to increase, and it is thus difficult to make the zoom optical system compact. Further, because the lens unit in the most magnification side has a positive refractive power, it is also difficult to provide a sufficient back focus. Moreover, the zoom optical system is based on a single-wavelength light source, and is not suitable for projection display of color images.

SUMMARY OF THE INVENTION

According to one aspect of the invention, a zoom optical system comprises a first lens unit having a positive optical power; a second lens unit having a negative optical power; a third lens unit having a positive optical power; and a fourth lens unit having a negative optical power, in order from the reduction conjugate side to the magnification conjugate side, wherein in an entire zoom range, a magnification-side conjugate position relative to a reduction-side conjugate position and a position of a pupil of the zoom optical system relative to the reduction-side conjugate position are substantially invariant, and the interval between the first lens unit and the second lens unit at a telephoto end is larger than the interval between the first lens unit and the second lens unit at a wide-angle end; the interval between the second lens unit and the third lens unit at the telephoto end is larger than the interval between the second lens unit and the third lens unit at the wide-angle end; and the interval between the third lens unit and the fourth lens unit at the telephoto end is smaller than the interval between the third lens unit and the fourth lens unit at the wide-angle end.

According to another aspect of the invention, a projecting optical system comprises the zoom optical system set out in the foregoing; a reflecting member disposed substantially at the position of the pupil and reflecting light from the zoom optical system; and a reflecting optical system including a plurality of reflecting surfaces successively reflecting light from the reflecting member, wherein a light beam incident to the zoom optical system from an original disposed at the reduction conjugate position is projected onto a surface to be projected by the reflecting optical system, and the reflecting member rotates, whereby a projected image projected onto the surface to be projected moves on the surface to be projected.

According to another aspect of the invention, an image projecting apparatus comprises the projecting optical system set out in the foregoing; and an image forming element forming the original.

According to another aspect of the invention, an image projecting apparatus is the image projecting apparatus set out in the foregoing, wherein in the entire zoom range, the distance between the reduction-side conjugate position and the first lens unit is equal to or more than three times as large as the maximum image height of the original.

According to another aspect of the invention, an image projecting system comprises the image projecting apparatus set out in the foregoing; and an image information providing apparatus providing image information for forming the original to the image projecting apparatus.

According to another aspect of the invention, the zoom optical system includes, in order from the reduction conjugate side to the magnification conjugate side, a first lens unit having a positive optical power; a second lens unit having a negative optical power; a third lens unit having a positive optical power; and a fourth lens unit having a negative optical power, wherein in an entire zoom range, a magnification-side conjugate position relative to a reduction-side conjugate position, and the position of a pupil of the zoom optical system relative to the reduction-side conjugate position are each substantially fixed, and the interval between the first lens unit and the second lens unit at a telephoto end is larger than the interval between the first lens unit and the second lens unit at a wide-angle end; the interval between the second lens unit and the third lens unit at the telephoto end is larger than the interval between the second lens unit and the third lens unit at the wide-angle end; and the interval between the third lens unit and the fourth lens unit at the telephoto end is smaller than the interval between the third lens unit and the fourth lens unit at the wide-angle end.

DESCRIPTION OF THE PREFERRED EMBODIMENTS

The object of this embodiment is to provide a zoom optical system which is not only excellent in a telecentric characteristic on the object side (reduction conjugate side) and excellent in invariance of the positions of an object surface (reduction conjugate position), an image plane (magnification conjugate position) and an exit pupil against variations in the focal length, but also compact, bright, and capable of providing a sufficient back focus.

First, features of the zoom optical system of this embodiment will be described.

The zoom optical system of this embodiment is constituted by a plurality of lens units including a first lens unit having a positive optical power, a second lens unit having a negative optical power, a third lens unit having a positive optical power and a fourth lens unit having a negative optical power in order from the reduction side to the magnification side. Of course, other optical elements may be included as auxiliary components. For example, even if a polarizing plate, a wave plate, a lens having a weak optical power (refractive power) (having a focal length larger than the focal length at the wide angle end or more than twice as large as the focal point at the wide angle end), a diffraction grating, a mirror and the like are added to the zoom optical system of this embodiment, it is substantially same as the zoom optical system of this embodiment.

The first feature consists in that the first lens unit is made to have a positive refractive power (optical power, i.e. inverse number of focal length) for providing a sufficient back focus and making the optical system bright while keeping the entire zoom optical system compact. Consequently, the numeral aperture (NA) on the object side can be increased while reducing the effective diameters of the second lens unit and subsequent lens units. If the refractive power of the first lens unit is negative, the effective diameters of the second lens unit and subsequent lens units tend to increase. If the interval between the first lens unit and the second lens unit is widened when the focal length varies even though the second lens unit is made to have a positive refractive power, the effective diameter increases, resulting in upsizing of the entire optical system.

The second feature consists in that when the focal length of the entire zoom optical system is changed to a larger focal length, i.e. the focal length is changed from that on the wide angle side to that on the telephoto side, a set of the second lens unit and the third lens unit having a positive synthetic refractive power is considerably moved toward the object side to widen the interval between the first lens unit and the second lens unit. If the pupil diameter is fixed against variations in the focal length, the NA on the object side is the minimum at the minimum focal length (wide angle end), and decreases as proportionately as the focal length increases, and therefore the second lens unit is disposed in the most object side at the wide angle end, and moved toward the image side as the focal length increases, whereby a high magnification can be obtained without increasing the effective diameter.

The third feature consists in that the interval between the second lens unit and the third lens unit and the interval between the third lens unit and the fourth lens unit are changed for satisfactorily correcting the aberration while the position of the object surface (reduction-side conjugate point), the position of the image plane (magnification-side conjugate point) and the pupil position are kept substantially constant in the entire zoom range. Specifically, in this embodiment, the lens units are moved so that the interval between the first lens unit and the second lens unit at the telephoto end is larger than the interval at the wide-angle end, the interval between the second lens unit and the third lens unit at the telephoto end is larger than the interval at the wide-angle end, and the interval between the third lens unit and the fourth lens unit at the telephoto end is smaller than the interval at the wide-angle end.

The fourth feature consists in that in all focal lengths between the maximum focal length (telephoto end) and the minimum focal length (wide-angle end), i.e. in the entire zoom range, of the zoom optical system, synthetic refractive powers of all sets of lens units, with each set consisting of two adjacent lens units of the above-mentioned plurality of lens units, are made positive. It is known that when the aberration of the lens is corrected, a first lens having a positive refractive power is generally combined with a second lens having a negative refractive power, whereby an aberration occurring in the first lens can be corrected to some degree by the second lens. In this embodiment, the interval between the first lens unit having a positive refractive power and a set of lens units consisting of the second lens unit having a negative refractive power and the third lens unit having a positive refractive unit and having a positive synthetic refractive power is changed to perform zooming. Namely, the zooming action is performed essentially with movement of the lens unit having a positive refractive power so as not to increase the total length in an optical system which has a long back focus and is bright. Here, the synthetic refractive power of the first lens unit and the second lens unit, the synthetic refractive power of the second lens unit and the third lens unit, and the synthetic refractive power of the third lens unit and the fourth lens unit are all positive.

The fifth feature consists in that the object side is substantially telecentric, and a plurality of lens units are moved along a locus defined so that the distance between the image side principal point of the zoom optical system and the exit pupil is substantially equal to the focal length of the zoom optical system in the entire zoom range.

The sixth feature consists in that a plurality of lens units are moved along a locus defined so that the interval between the object side principal point and the image side principal point in the zoom optical system is substantially equal to $$E = fz - fz(x'+fz)/x' \qquad (1),$$

where E represents the distance between the object surface and the exit pupil plane located between the object surface and the image plane of the zoom optical system, x' represents the distance between the exit pupil surface and the image plane, and fz represents the focal length of the zoom optical system. Here, the description of "substantially equal" means that a deviation of 5% (preferably 3%, more preferably 1%) or less from the vale of the conditional formula (1) is acceptable.

Figure 3:
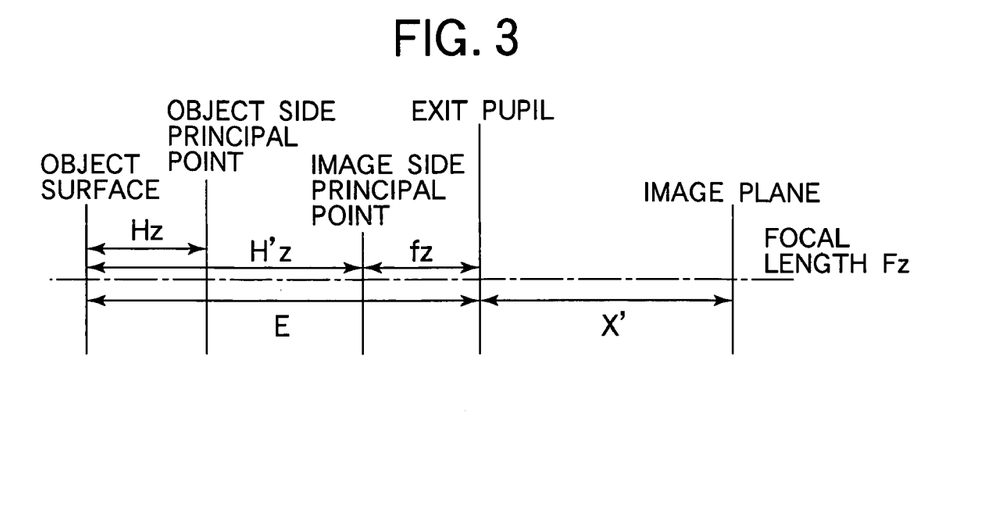
FIG. 3 shows a paraxial relation of the embodiment.

A paraxial relation of the zoom optical system of this embodiment is shown in FIG. 3. If the object side is telecentric, an exit pupil emerges at a distance equivalent to the focal length fz of the zoom optical system from the image side principal point. The arrangement of the lens unit and the locus of movement of the lens unit in the zoom optical system of this embodiment are set so that in the entire zoom range, the image side principal point is located at a distance of the focal length fz in the zooming state from a predetermined exit pupil position toward the object side (the fifth feature).

The object side principal point is set so that the object surface and the image plane have a predetermined magnification relation at a predetermined object side principal point position during zooming, in addition to a relation with the exit pupil position. Namely, ideally, if the lens unit is disposed so that the image side principal point is located at a distance equivalent to the focal length fz from the exit pupil position toward the object side, and the interval between object side principal point and the image side principal point (H'z–Hz) is substantially equal to the formula (1), the positions of the object surface, the image plane, the entrance pupil (infinite distance) and the exit pupil can be fixed during zooming in the telecentric optical system (sixth feature).

The seventh feature consists in that in the entire zoom range, the distance between the object surface and the first lens unit (back focus) is equal to or more than three times as large as the maximum object height (which means a distance between a point farthest from an optical axis in an effective region of an image forming element such as a liquid crystal display panel disposed at the reduction-side conjugate point position and the optical axis, and is synonymous with "maximum image height of original" as a meaning other than the maximum object height). In a tri-panel type image projecting apparatus of the embodiment described later, a color synthesizing member synthesizing chromatic light of three colors of red, green and blue is disposed on the reduction side in the zoom optical system, and therefore if the back focus is equal to or more than three times as large as the maximum object height, space for disposing the color synthesizing member can be provided.

The eighth feature consists in that in the entire zoom range, the distance between the fourth lens unit and the exit pupil is longer than half (or preferably as same as, more preferably twice as large as) the minimum diameter of the pupil. Consequently, if a rotatable mirror is disposed at the position of the exit pupil, interference between the mirror and the fourth lens unit can be avoided as in the embodiment described later, for example. In fact, a drive mechanism of the mirror exists around the mirror, and therefore it is necessary to make the above-mentioned distance larger than half the minimum diameter of the exit pupil to some extent, however the distance should be set to 10% or less of the distance (conjugate length) between the object surface and the image plane (conjugate points of the reduction side and the magnification side). The reason why the "minimum diameter of the pupil" is employed is that it is applied even if pupil diameters are different in two mutually orthogonally crossing directions on the pupil surface as in embodiments described later. The minimum diameter of the pupil is a diameter of an inscribed circle of the outer shape of the pupil.

Embodiment

Figure 2:
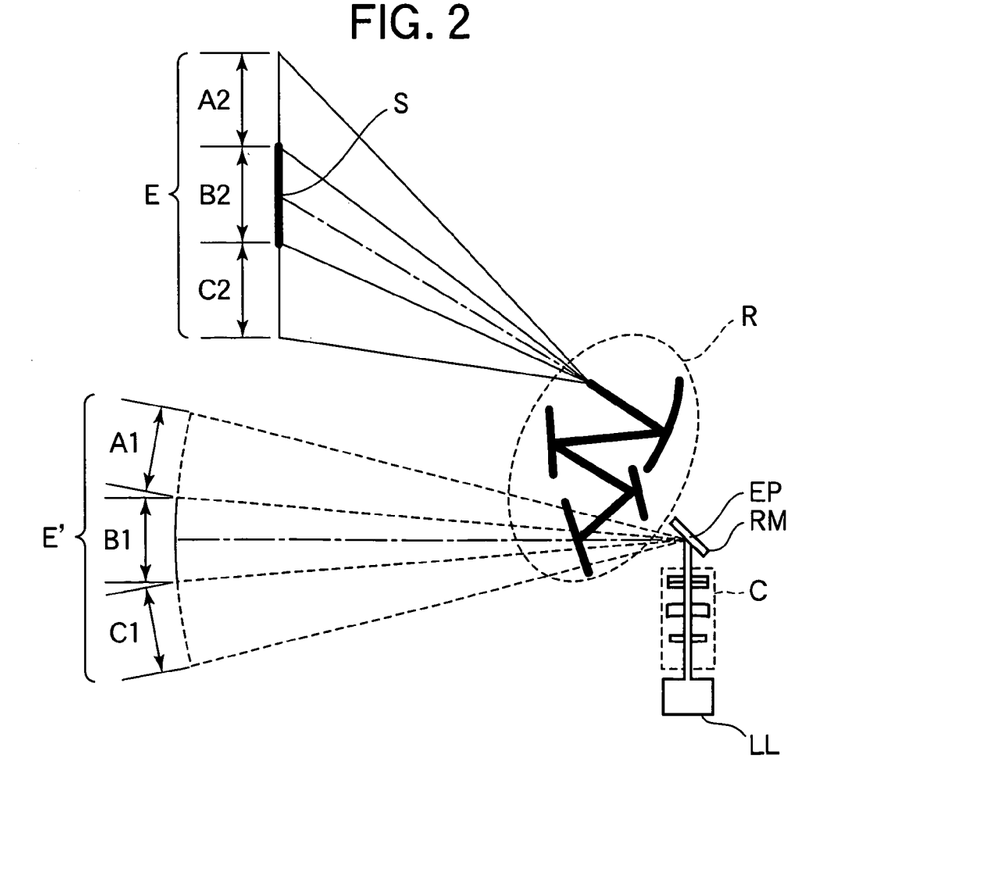
FIG. 2 shows a principle on which an angle of projection is changed in the embodiment.

An image projecting apparatus comprising a projecting optical system having a zoom optical system of an embodiment of the present invention combined with an Off-Axial optical system is shown in FIG. 2. Here, the Off-Axial optical system is defined as an optical system including a curved surface (Off-Axial curved surface) where given that a optical path through which a light beam passing through the center of an image and the center of a pupil passes is a reference axis, a plane normal line at the cross section of a constituent plane with the reference axis does not exist on the reference axis. In this case, the reference axis has a bended shape. The constituent plane of the optical system is made asymmetrical to the reference axis and aspherical, whereby an optical system with its aberration sufficiently corrected can be constructed (see Japanese Patent Application Laid-Open No. H09-005650, Japanese Patent Application Laid-Open No. H08-292371, Japanese Patent Application Laid-Open No. H08-292372 and Japanese Patent Application Laid-Open No. H09-222561).

In this Off-Axial optical system, the constituent plane is generally non-coaxial, vignetting does not occur on a reflecting surface, and therefore an optical system using the reflecting surface is easily constructed. An intermediate image is formed within the optical system, whereby an optical system which is compact while having a wide view angle can be formed. Further, the optical path can be drawn relatively freely despite the pre-stop optical system, thus making it possible to form a compact optical system.

In this embodiment, by employing such an Off-Axial optical system, a projecting optical system having a wide view angle, a high precision and a high magnification can be achieved, and further the zoom optical system of this embodiment is employed and also a flat mirror described later is rotated, whereby a projected image can be considerably moved and tilted (i.e. a projection angle can be changed) with reduced degradation of image quality.

A basic principle for changing the projection angle while maintaining a satisfactory optical performance will now be described using FIG. 2. In FIG. 2, reference symbol LL denotes an image forming element, such as a liquid crystal panel, and an illumination system illuminating light modulated by the image forming element. Reference symbol C denotes an optical block having an image formation feature.

Light exiting from the illumination system and modulated by the image forming elements is reflected by a rotatable flat mirror RM, and the forms an image on a region B1 on a spherical surface E' having a center of curvature at the position of an exit pupil EP of a first optical block C. The first optical block C should only have a capability of forming an image on a curved surface region B1, and therefore it may be coaxially rotational symmetrical optical block, or may be an optical block including as a component a reflecting surface having a curvature. However, in this embodiment, the first optical block C is formed from the zoom optical system according to the present invention.

Further, if the flat mirror RM disposed at the position of the exit pupil EP is rotated on the plane of FIG. 2, the image formed on the region B1 moves to a region A1 or C1 on the spherical surface E' with little optical change. Namely, the image continuously moves on the spherical surface E' while retaining its image-formed states.

Light reflected on the flat mirror RM is guided to a second optical block R as the Off-Axial optical system having components of a plurality of reflecting surfaces with curvatures. At this time, the second optical block R is designed to form an image on the spherical surface E' on a screen E with a satisfactory optical performance. Further, owing to the characteristics of the Off-Axial optical system, an image is projected obliquely onto the screen E without causing deformation of the image.

Thus, in a state in which the flat mirror RM rotates to a position forcing light toward the region B1, the image of an original formed on the image forming element is displayed on a region B2 of the screen E via the first optical block C, the flat mirror RM and the second optical block R.

By rotating the flat mirror RM, images formed on regions A1, B1 and C1 on the spherical surface E' can be formed on regions A2, B2 and C2 on the screen E, respectively. Namely, an image can be projected at any projection angle onto an area (screen E) where the second optical block R ensures a satisfactory optical performance. However, the member rotating about the exit pupil EP of the first optical block C is not limited to the flat mirror RM, but the first optical block C and the image forming element may be integrally rotated, or the second optical block R may be rotated. Such rotation is relative rotation of the above-mentioned optical blocks, and therefore rotation of any of the optical blocks leads to an optically equivalent result.

Further, in the region B1 on the spherical surface E', it is not necessarily required to form an image on a spherical surface. Namely, the surface E' is not required to be spherical. In other words, for making the projection angle variable, it is required that the image of the first optical block C can continuously move on the surface E' while maintaining a satisfactory optical performance, and for ideally meeting the requirement, the surface E' is preferably spherical. In fact, however, the tolerance of the optical performance such as a focus depth and a distortion has some latitude, if the optical performance is within this tolerance, the surface E' may have any shape, and is not necessarily required to be spherical. For the positional accuracy of the flat mirror RM disposed at the position of the exit pupil EP, the flat mirror RM is not necessarily required to strictly coincide with the position of the exit pupil EP of the first optical block C, but may coincide with some degree of tolerance.

Further, the image formation performance of the first optical block C will be described more in detail. If the image plane S is made movable two-dimensionally on the screen E by the projecting optical system of this embodiment, it is not necessary that aberrations within entire view angle should be sufficiently corrected if such aberrations are each uniformly generated in each azimuth direction. This is because if aberrations within entire view angle are uniformly generated, the aberrations can be corrected by the second optical block R constituted by reflecting surfaces having curvatures.

If the image plane S is made movable only along one-dimensional direction on the screen E, an image formation performance in a direction different from the direction of movement is not required to be satisfactory if aberrations within entire view angle are uniformly generated in the direction of movement. This is because the aberrations can be corrected by the second optical block R.

Only the principle for movement of the image plane on the plane of FIG. 2 has been described, but the same result is obtained even if the image plane is moved along a direction orthogonally crossing the plane of the figure. However, if the member rotating about the exit pupil EP of the first optical block C is only the flat mirror RM, and the image plane is moved two-dimensionally on the screen E, a flat mirror involved in horizontal rotation and a flat mirror involved in vertical rotation should be used. This is because if the flat mirror RM is rotated along a direction orthogonally crossing the plane of the figure in FIG. 2, the image forming element and the flat mirror RM have a twisted positional relationship, and therefore a light beam on the reference axis is formed into an image at a desired position on the screen E, however the image plane S rotates on the screen E.

However, it is physically impossible to displace a plurality of flat mirrors at the exit pupil EP of the first optical block C. Therefore, the flat mirror RM is not required to be disposed strictly at the position of the exit pupil EP, but two flat mirrors RM may be disposed in the vicinity of the exit pupil and spaced so as not to interfere with each other as long as the image on the surface E' has an optical performance within the tolerance.

In the projecting optical system and the image projecting apparatus, the case where zooming is performed will now be described. If the first optical block C is provided with a zooming function to change the sizes of images formed on regions A1, B1 and C1 on the spherical surface E' formed by the first optical block C, the sizes of images formed on regions A2, B2 and C2 on the actual image plane (screen) E can be changed.

However, it is desirable that the position of the exit pupil EP should be kept invariant during zooming in order to rotate the mirror RM at the position of the exit pupil EP of the first optical block C based on the explanation of the principle described above. If the position of the exit pupil EP is invariant, the mirror RM and the second optical block R can be disposed at fixed positions.

For the normal camera lens, it is required that the positions of the object surface and the image plane should be invariant with respect to the continuously varying focal length, however, for the first optical block C of this embodiment, i.e. the zoom optical system according to the present invention, it is required that the positions of the entrance pupil and the exit pupil should be invariant regardless of variations in the focal length in addition to the requirement described above. The reason why it is required that the position of the exit pupil should be invariant is as explained in the principle described above. However, the reason why it is required that the position of the entrance pupil should be invariant is that if a liquid crystal panel is used as an image forming element, the telecentric characteristic is required.

The more specific configuration of a zoom optical system which provides sufficient space (i.e. back focus of the first optical block C) for inserting a color synthesizing element and the like between the image forming element and the first optical block C (zoom optical system) in a tri-panel type image projecting apparatus synthesizing red, green and blue modulated light and making the synthesized light incident to the first optical block, and is excellent in a telecentric characteristic on the object side, and excellent in invariance of the positions of the object surface, the image plane, the entrance pupil and the exit pupil regardless of variations in the focal length will be described below.

Figure 4:
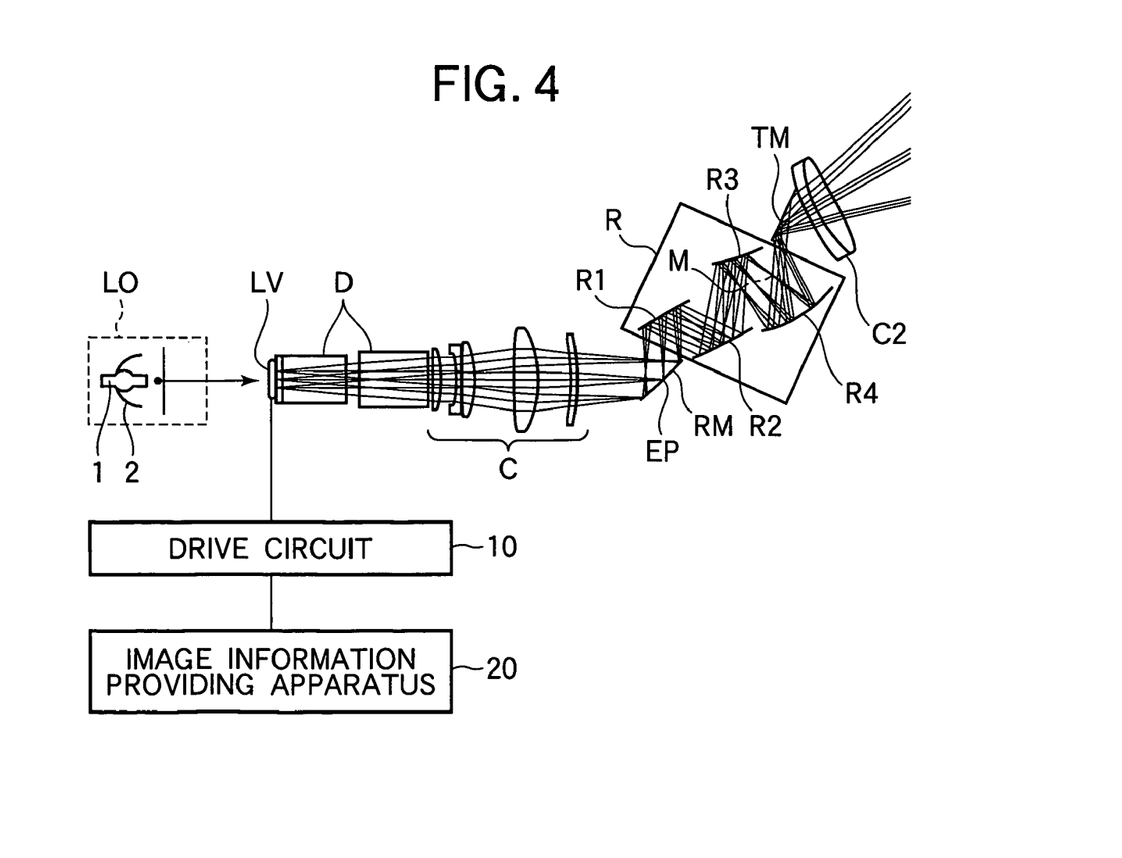
FIG. 4 is a sectional view showing a projecting optical system and an image projecting apparatus of the embodiment.

First, the overall configuration of the tri-panel type image projecting apparatus is shown in FIG. 4. In FIG. 4, reference symbol LO denotes an illumination system, which has a white light source lamp 1, a reflecting mirror 2, and a color splitting element (not shown) splitting white color from the light source lamp 1 into three components of red, green and blue.

Reference symbol LV denotes a transmission type liquid crystal display panel as an image forming element. A drive circuit 10 is connected to this liquid crystal display panel LV. An image information providing apparatus 20 such as a personal computer, a DVD player, a video (VCR), a television, a digital video or still camera, or a reception unit constituted by an antenna receiving images by radio waves, and a tuner is connected to the drive circuit 10. The drive unit 10 which has received image information from the image information providing apparatus 20 sends a drive signal corresponding to the image information to the liquid crystal display panel LV. The liquid crystal display panel LV which has received the drive signal forms an original corresponding to the drive signal with liquid crystals, and modulates illuminating light from the illumination system LO. In this embodiment, although not shown in the figure, three liquid crystal display panels for red, green and blue are provided for the liquid crystal display panel LV, and form originals of red, green and blue, respectively.

In this embodiment, transmission type liquid crystal display panels are used as an image forming unit, but the present invention is not limited thereto, and may be applied even when reflection type liquid crystal panels and digital micro-mirror arrays (DMD) can be used, or self-luminous elements (electroluminescence elements) requiring no illumination system can be used.

Reference symbol D denotes a dichroic prism as a color synthesizing element synthesizing chromatic light modulated by three liquid crystal display panels LV. The dichroic prism D is provided with a plurality of dichroic films, and light of three colors is synthesized by transmission or reflection actions appropriate to wavelengths in the dichroic films. In FIG. 4, two dichroic prisms are shown, but this configuration may be changed according to what is required by the image forming element LV. A polarization beam splitter may be used instead of the dichroic prism.

Reference symbol C denotes a zoom optical system constituting the first optical block in FIG. 2, and the zoom optical system is a refractive optical unit (hereinafter referred to as first refractive optical unit) constituted by a plurality of lens units as a co-axial optical system. Reference symbol EP denotes an exit pupil of the zoom optical system, which is also an entrance pupil of a reflecting optical unit R as the second optical block which is an Off-Axial optical system constituted by a plurality of reflecting surfaces R1 to R4. A stop may be provided at or near this position if required.

Light chromatically synthesized by the dichroic prism D passes through the first refractive optical unit C, the first flat mirror RM rotatable at the position of the exit pupil EP and the reflecting optical unit (R1 to R4), further passes through a second flat mirror TM and a second refractive optical unit C2, and is projected on a magnified scale onto a screen (not shown) which is a surface to be projected. Here, the second refractive optical unit C2 is constituted by a cemented lens of one negative lens (negative meniscus lens convex toward the reduction conjugate side) and one positive lens (double-convex lens), but the second refractive optical unit C2 is not limited to this configuration. Of course, a negative lens and a positive lens may be disposed at an interval instead of used as a cemented lens, the second refractive optical unit C2 may be constituted by a double-concave lens and a double-convex lens, or a negative meniscus lens convex toward the magnification conjugate side and a positive meniscus lens convex toward the magnification conjugate side may be cemented together. Alternatively, the second refractive optical unit C2 may be only one positive lens (preferably a positive lens convex toward the magnification conjugate side), or only one negative lens. However, the number of refractive optical elements disposed in the side of the surface to be projected than the reflecting optical system is preferably 4 or less.

The projecting optical system constituted by the first and second refractive optical units C and C2, the first and second flat mirrors RM and TM, and the reflecting optical unit R corrects a trapezoidal distortion by the refractive optical unit R serving as an Off-Axial optical unit and obliquely projects an image onto the screen.

By including the first refractive optical unit C in the projecting optical system, an optical power required for projection onto a screen on a magnified scale can be shared by the first refractive optical unit C and the reflecting optical unit R as appropriate. Therefore, the curvatures of the reflecting surfaces of the reflecting optical unit R can be moderated, production can be simplified, and the degree of sensitivity to production errors can be reduced. The reflecting surface closer to the pupil is more significantly influenced by an astigmatic difference and the like resulting from production errors. The astigmatic difference and the like occurring in a first reflecting surface closest to the exit pupil EP among a plurality of reflecting surfaces are magnified in accordance with the magnification of the reflecting optical unit. Thus, the magnification (optical power) required for projection of images is shared with the refractive optical system having a lower degree of sensitivity to performance degradation resulting from production errors compared with the reflecting optical system, whereby the degree of sensitivity of the reflecting optical system can be reduced.

Further, even if the projecting optical system has a wide angle, occurrence of a magnification chromatic aberration is relatively easily suppressed by increasing the focal length of the first refractive optical unit C. The reflecting optical unit R is effective in correction of various aberrations because no chromatic aberration occurs.

In FIG. 4, the reflecting surfaces R1 to R4 (all of which have an optical power) constituting the reflecting optical unit R each have a rotational asymmetrical shape, and constitute the Off-Axial optical system in which the reference axis is bent as described previously.

Further, in this embodiment, an intermediate image is formed once between reflecting surfaces R3 and R4 (intermediate image-formed plane M) in the reflecting optical unit R (a surface conjugate to both the liquid crystal display panel and screen is formed between reflecting surfaces R3 and R4 in the reflecting optical unit). This allows the sizes of the reflecting surfaces to be reduced compared with reflecting surfaces having no intermediate image-formed plane, and is therefore effective in making a surface shape with high precision. The position of the intermediate image-formed plane is not limited to the position shown in FIG. 4. In this embodiment, the reflecting optical unit R includes four reflecting surfaces having an optical power, but the present invention is not limited thereto, and the reflecting optical unit R may include any number of reflecting surfaces as long as it has 2 (preferably 3) or more reflecting surfaces. If the intermediate image is formed between the reflecting surface on the most screen side and the reflecting surface on the second-most screen side, the sizes of the reflecting surfaces can be reduced.

Thus, in the projecting optical system shown in FIG. 4, by rotating the first flat mirror RM in accordance with the principle for changing the projection angle as described using FIG. 2, the angle of projection of an image from the projecting optical system can be changed.

Figure 1A:
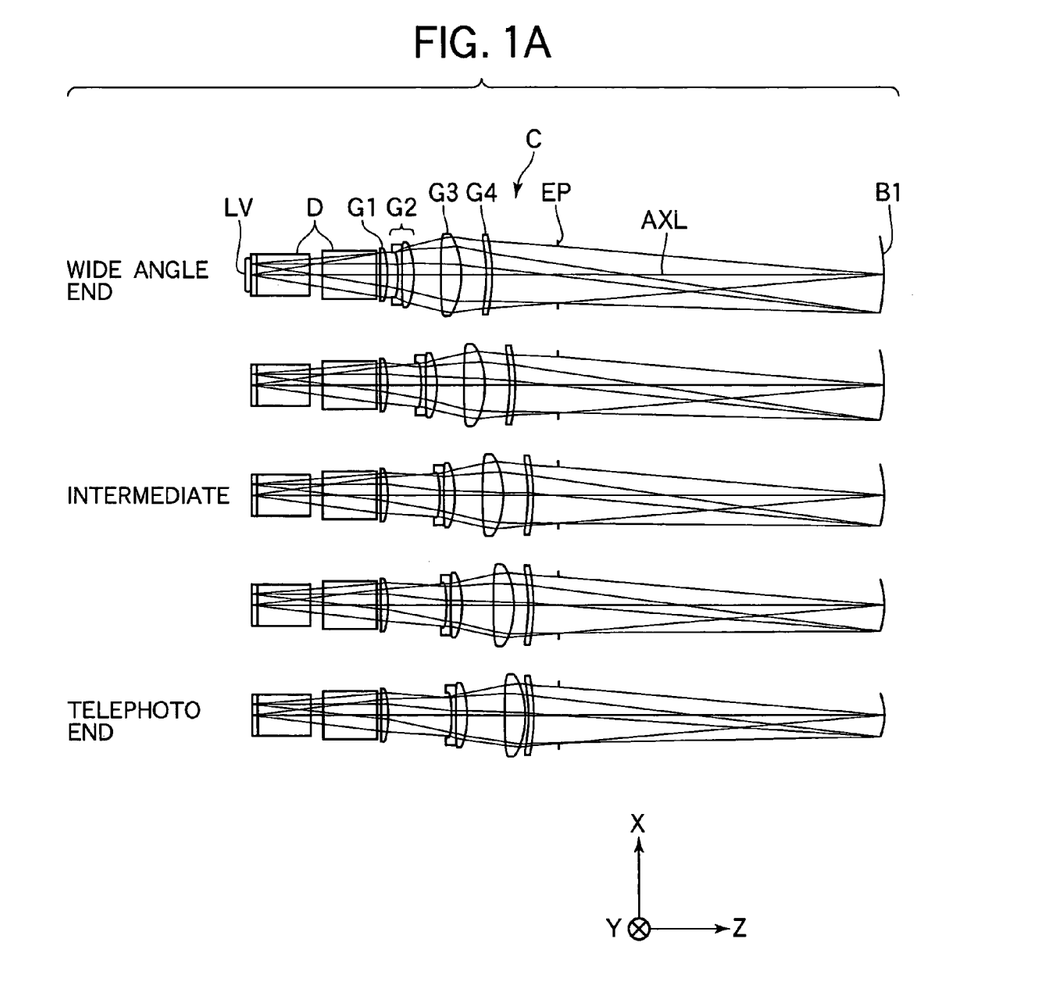
FIG. 1A is a sectional view showing the configuration of a zoom optical system of an embodiment of the present invention.
Figure 1B:
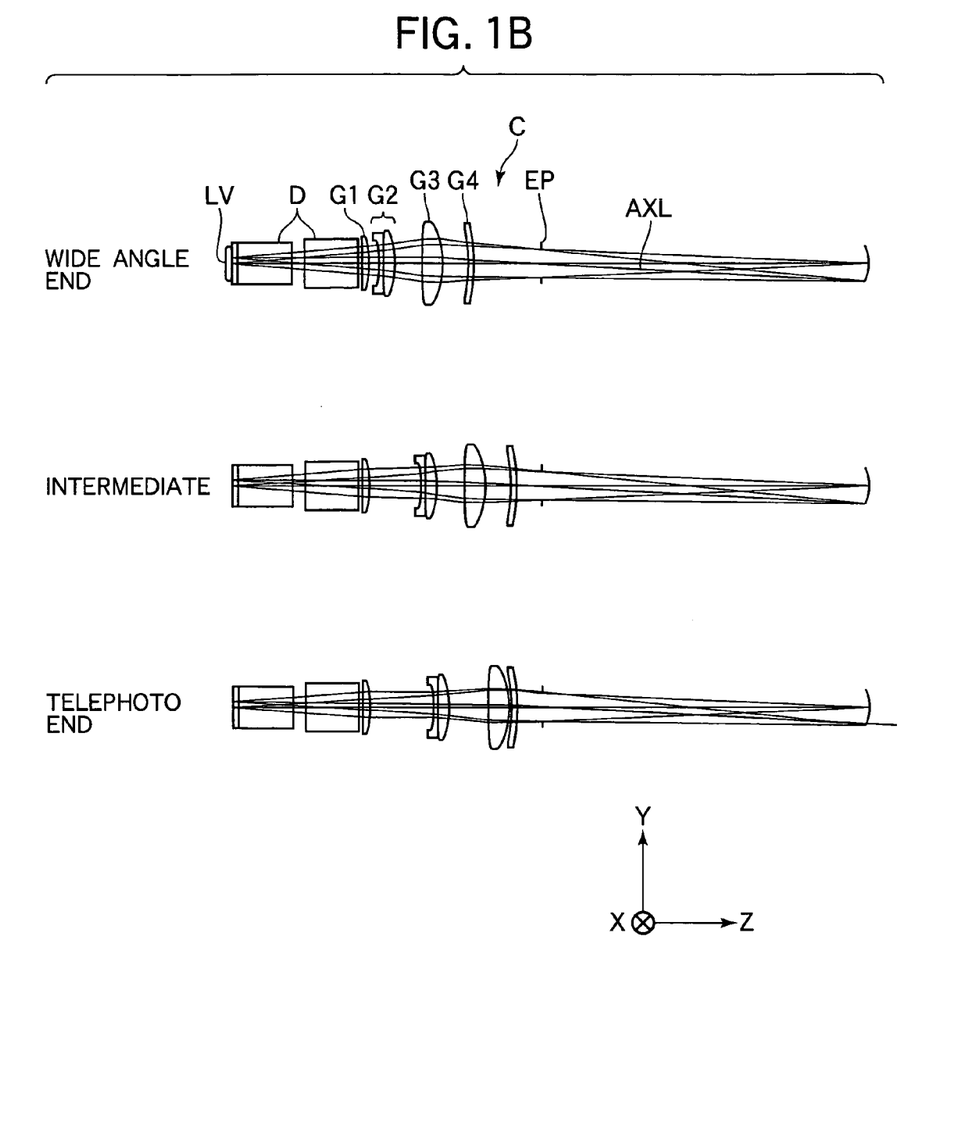
FIG. 1B is a sectional view showing the configuration of the zoom optical system of the embodiment.

The configurations of an XZ section and a YZ section of the zoom optical system constituting the first refractive optical unit C are shown in FIGS. 1A and 1B, respectively. As described previously, this zoom optical system is used as a partial system constituting part of the projecting optical system. Reference symbols LV, D and EP denote components same as those denoted by same symbols in FIG. 4.

In FIGS. 1A and 1B, the first refractive optical unit (zoom optical system) C is constituted by a first lens unit G1 having a positive optical power, a second lens unit G2 having a negative optical power, a third lens unit G3 having a positive optical power and a fourth lens unit G4 having a negative optical power in order from the reduction side to the magnification side (in this embodiment, from the liquid crystal display panel LV side (object side) to the spherical region B1 side (image side): the region B1 is hereinafter referred to as image plane). The first to fourth lens units G1 to G4 each move along an optical axis AXL during zooming for changing the focal length.

In the first refractive optical unit C, the object side is always substantially telecentric, and the position of the exit pupil EP located between the fourth lens unit G4 and the image plane B1, the position of the reduction-side conjugate point at which the liquid crystal display panel LV is disposed, and the position of the magnification-side conjugate point at which the image plane B1 is located are each substantially fixed in all focal length states between the maximum focal length (telephoto end) and the minimum focal length (wide-angle end), i.e. in the entire zoom range.

Here, the position of the image plane B1 (position of magnification-side conjugate point) being fixed means that the position of this image plane B1 and the position of the liquid crystal display panel (position of reduction-side conjugate point) are substantially invariant. Specifically, the distance (distance on the optical path of a light beam passing through the optical axis of the first refractive optical unit) between the conjugate point of the liquid crystal display panel formed by the optical system (including the first refractive optical unit C) disposed between the liquid crystal display panel and the exit pupil and the liquid crystal display panel varies by only 5% (preferably 3%, more preferably 1%) or less in the entire zoom range (from wide-angle end to telephoto end). The variation in the distance mentioned here means that the minimum value of the distance in the entire zoom range is within a range of from 5% or less of the maximum value with respect to the maximum value (maximum value×0.95≦minimum value).

The same holds true for the position of the exit pupil, and the position of the exit pupil being fixed means that the position of the exit pupil relative to the position of the liquid crystal display panel is invariant. The minimum value of the distance between the exit pupil and the liquid crystal display panel in the entire zoom range is 95% or more (preferably 97% or more, more preferably 99% or more) of the maximum value.

This is because in fact, the tolerance of the optical performance such as a focus depth and a distortion has some latitude as described previously.

In the first refractive optical unit C, the interval between the first lens unit G1 and the second lens unit G2 monotonously increases, the interval between the second lens unit G2 and the third lens unit G3 monotonously increases, and the interval between the third lens unit G3 and the fourth lens unit G4 temporarily increases and then decreases during zooming from the wide-angle end to the telephoto end.

Comparison of the lens interval at the telephoto end with the lens interval at the wide-angle end shows that the interval between the first lens unit G1 and the second lens unit G2 at the telephoto side is larger than that at the wide-angle end, the interval between the second lens unit G2 and the third lens unit G3 at the telephoto end is larger than that at the wide-angle end, and the interval between the third lens unit G3 and the fourth unit G4 at the telephoto end is smaller than that at the wide-angle end.

Figure 1C:
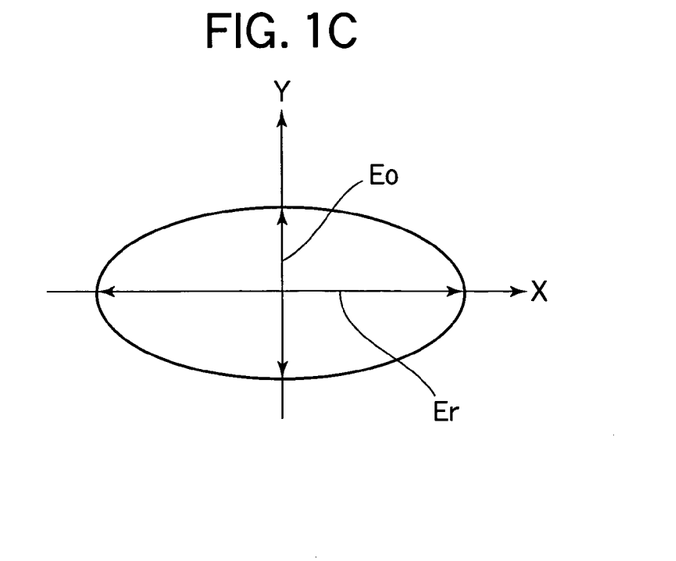
FIG. 1C shows an exit pupil diameter of the zoom optical system of the embodiment.

In this embodiment, the width Eo of the exit pupil EP in the Y axis direction and the width Er in the X axis direction have a relation of Eo<Er (e.g. Er=2Eo). Namely, the diameter of the exit pupil EP is different for the Y axis direction and the X axis direction, and the minimum diameter is Eo.

Figure 8:
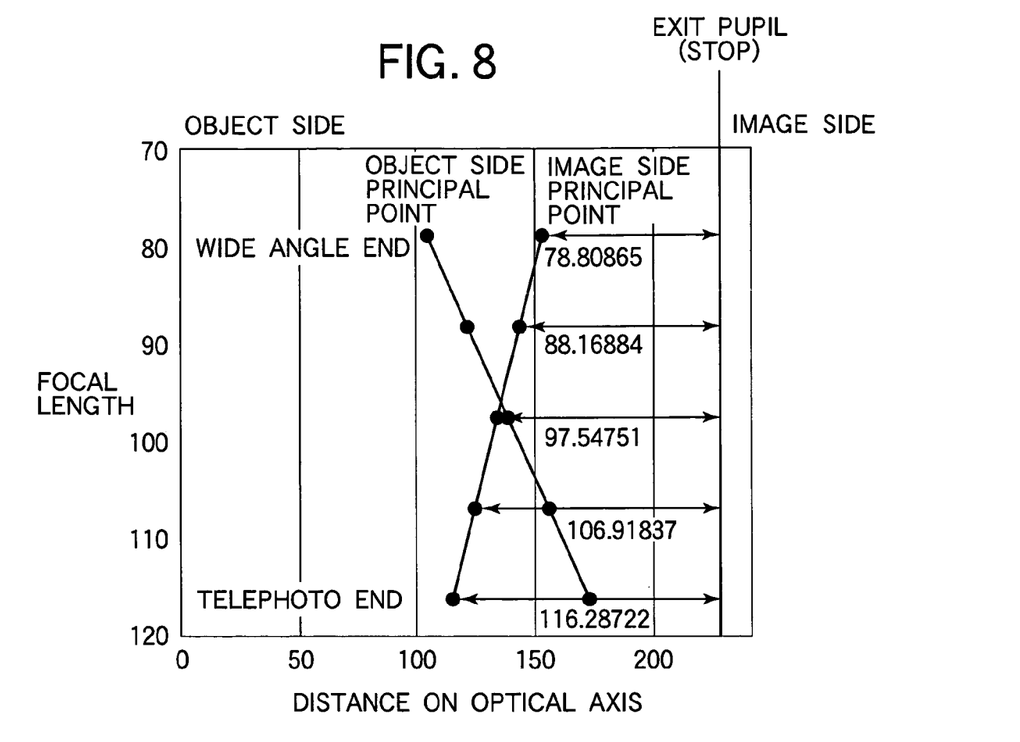
FIG. 8 shows a relation between an object side principal point and an image side principal point in the zoom optical system of the embodiment.
Figure 9:
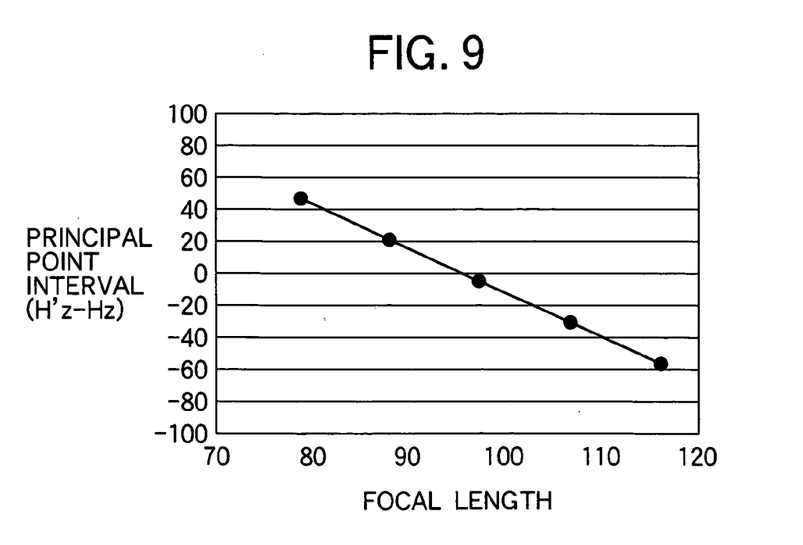
FIG. 9 shows a relation between a focal length and a principal point interval in the zoom optical system of the embodiment.

Further, the positional relationship between the object side principal point and the image side principal point during zooming is shown in FIG. 8, and the interval between the object side principal point and the image side principal point is shown in FIG. 9. As apparent from FIG. 8, the distance between the image side principal point and the exit pupil substantially coincides with the focal length of the first refractive optical unit C at this time. Therefore, in addition to the object surface and the image plane, the exit pupil plane can be substantially fixed during zooming in the entire zoom range.

The flat mirror RM is disposed at the position of the exit pupil EP and rotated, whereby the image plane B1 can be moved.

As a numerical embodiment corresponding to the embodiment shown in FIG. 4, constructive data for the first refractive optical unit is shown in Table 1. In Table 1, the surface number i indicates the i-th surface when counted from the object side. R represents a paraxial curvature radius of the i-th surface, d represents an interval between the i-th surface and (i+1)-th surface, and n and ν represent a refractive index and an Abbe constant of a medium between the i-th surface and the (i+1)-th surface, respectively.

Where the X axis is provided along the optical axis direction, the H axis is provided along the direction orthogonally crossing the optical axis direction, the light traveling direction is positive, and aspherical coefficients are K, B, C and D, the aspherical shape is expressed by the formula (2), and coefficients (aspherical coefficients) within the formula are described in the table. "E−X" represents "×10$^{-X}$".

$$X = \frac{(1/R)H^2}{1+\sqrt{1-(1+K)(H/R)^2}} + AH^4 + BH^6 + CH^8 + DH^{10}$$

TABLE 1

Focal length fz: 78.80–116.29 mm
Magnification ratio: 1.48
Aperture stop diameter(radius): 21.2 mm

| Surface Number | R | d | n | ν |
|---|---|---|---|---|
| 1 | ∞ | 2.60000 | 1.516330 | 64.14 |
| 2 | ∞ | 41.50000 | 1.622992 | 58.17 |
| 3 | ∞ | 7.82000 | | |
| 4 | ∞ | 40.13000 | 1.846660 | 23.78 |
| 5 | ∞ | (d5 variable) | | |
| 6 | 1134.73830 | 6.09027 | 1.517417 | 52.43 |
| 7 | −48.14399 | (d7 variable) | | |
| 8 | −29.83139 | 2.50000 | 1.698947 | 30.13 |
| 9 | 567.31211 | 1.00000 | | |
| 10 | 225.55868 | 10.00000 | 1.603112 | 60.64 |
| 11 | −55.14159 | (d11 variable) | | |
| 12* | 442.53991 | 15.00000 | 1.583126 | 59.37 |
| 13* | −51.43442 | (d13 variable) | | |
| 14 | −97.07782 | 3.00000 | 1.516330 | 64.14 |
| 15 | −139.33300 | (d15 variable) | | |
| 16 | (aperture stop) | 243.47290 | | |
| 17 | (image plane) | | | |

Aspherical Coefficients
12 K: −34.582339 A: −0.188358E−6 B: 0.133296E−9 C: 0.127487E−12 D: 0.129042E−15
13 K: 0.000933 A: 0.703051E−6 B: 0.392151E−9 C: −0.105058E−12 D: 0.324001E−15

| | | Variable Intervals | | |
|---|---|---|---|---|
| fz | 78.8093 | 88.1695 | 97.5481 | 106.9189 | 116.2877 |
| d5 | 2.13756 | 2.43999 | 2.96235 | 3.82797 | 4.64969 |
| d7 | 6.74199 | 23.87869 | 35.27061 | 42.81515 | 47.63221 |
| d11 | 21.42663 | 21.03689 | 22.31438 | 24.62870 | 27.86209 |
| d13 | 20.36137 | 23.79102 | 19.62730 | 11.88870 | 2.99451 |
| d15 | 50.69526 | 30.21622 | 21.18817 | 18.20228 | 18.22431 |

The back focus in Table 1 is greater than 2.60+41.50+ 7.82+40.13=92.05 (mm). This back focus length value corresponds to 56.83 (mm) in air. Preferably, the back focus converted in air is 40 mm or greater (preferably 50 mm or greater) in the entire zoom range. In other words, preferably, it is 50% or greater (preferably 60% or greater) of the focal length at the wide-angle end of the zoom optical system.

The zoom ratio (value obtained by dividing the focal length at the telephoto end by the focal length at the wide-angle end) is not specifically limited although the zoom ratio of this example is 1.48. Here, the zoom ratio should only be at least 1.2 or greater (preferably 1.3 or greater, more preferably 1.4 or greater). Preferably, the upper limit of the zoom ratio is 3.0 or less, preferably 2.5 or less, more preferably 2.0 or less.

Further, it is desirable to satisfy the following expression, $$0.1f < D < 0.65f,$$

where D represents the aperture stop diameter and f represents the focal length at an side angle position of the zoom lens (F number can be written as F=f/D). Using F-number, the equation can be formulated as 1.54<F<10. More preferably, it is desirable to satisfy the following expression, 1.54<F<2.5, that is, 0.4f<D<0.65f.

In addition, in the present embodiment, a panel, whose diagonal length is 0.7 inch, aspect ratio is 3:4 (10.668 mm×14.224 mm), is used.

Figure 5:
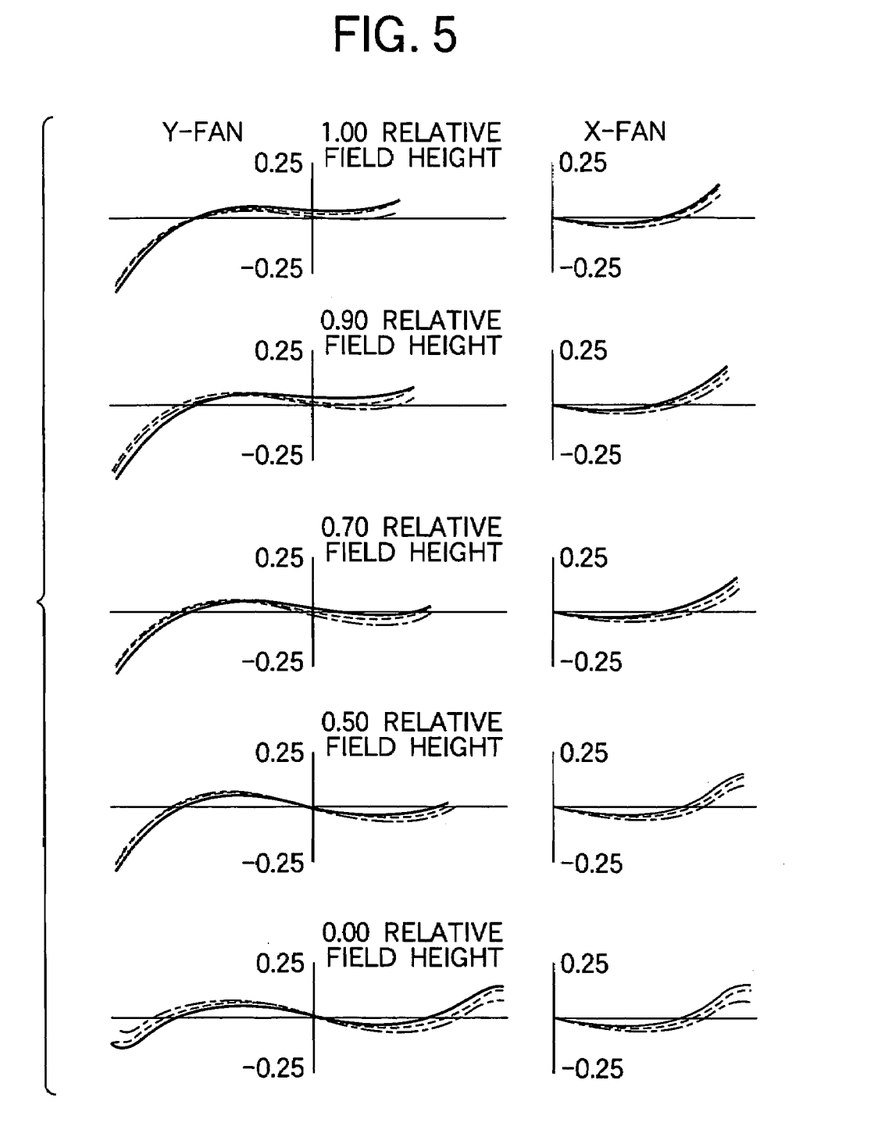
FIG. 5 shows graphs of lateral aberration of the zoom optical system of the embodiment (numerical embodiment)
Figure 6:
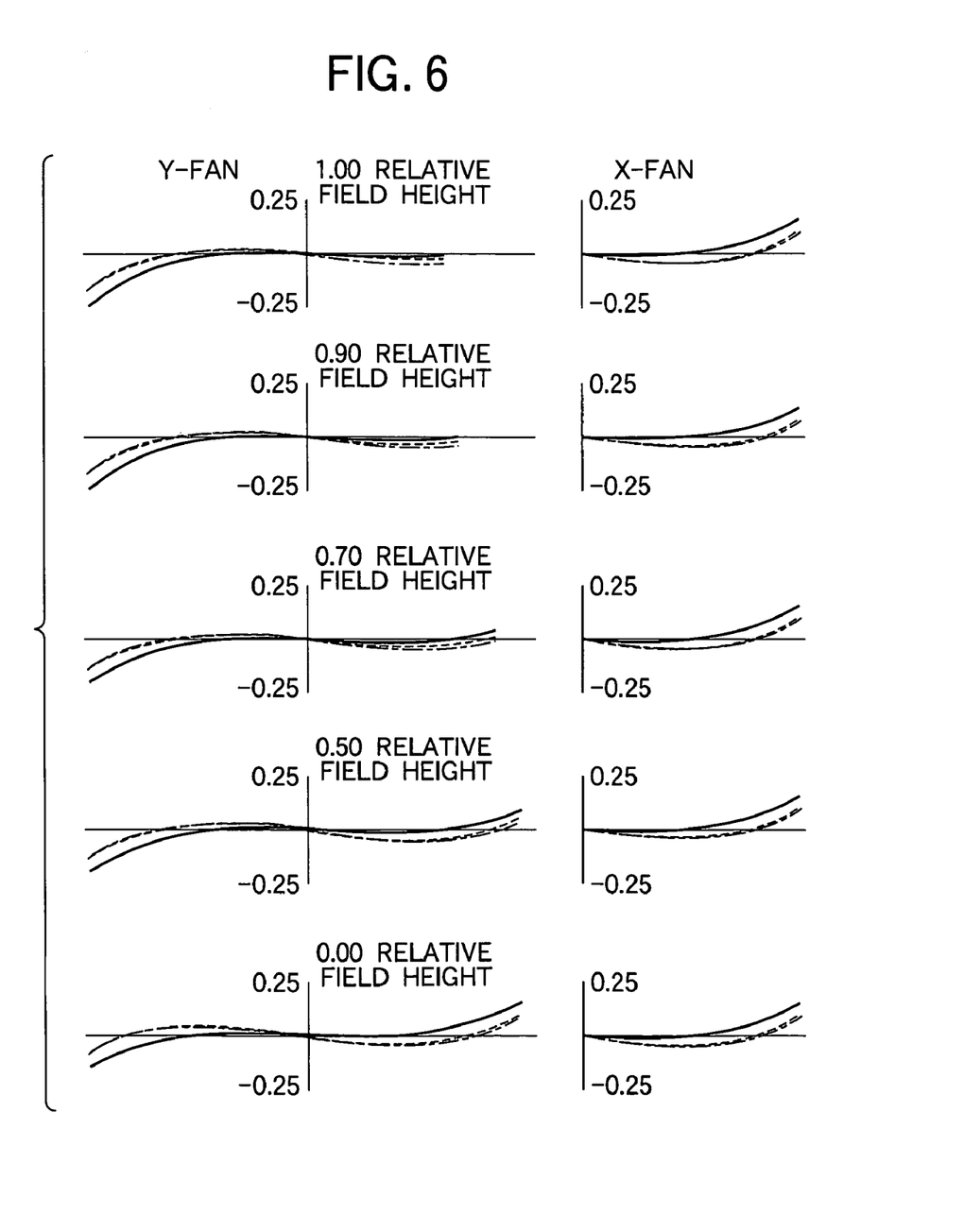
FIG. 6 shows graphs of lateral aberration of the zoom optical system of the embodiment (numerical embodiment)
Figure 7:
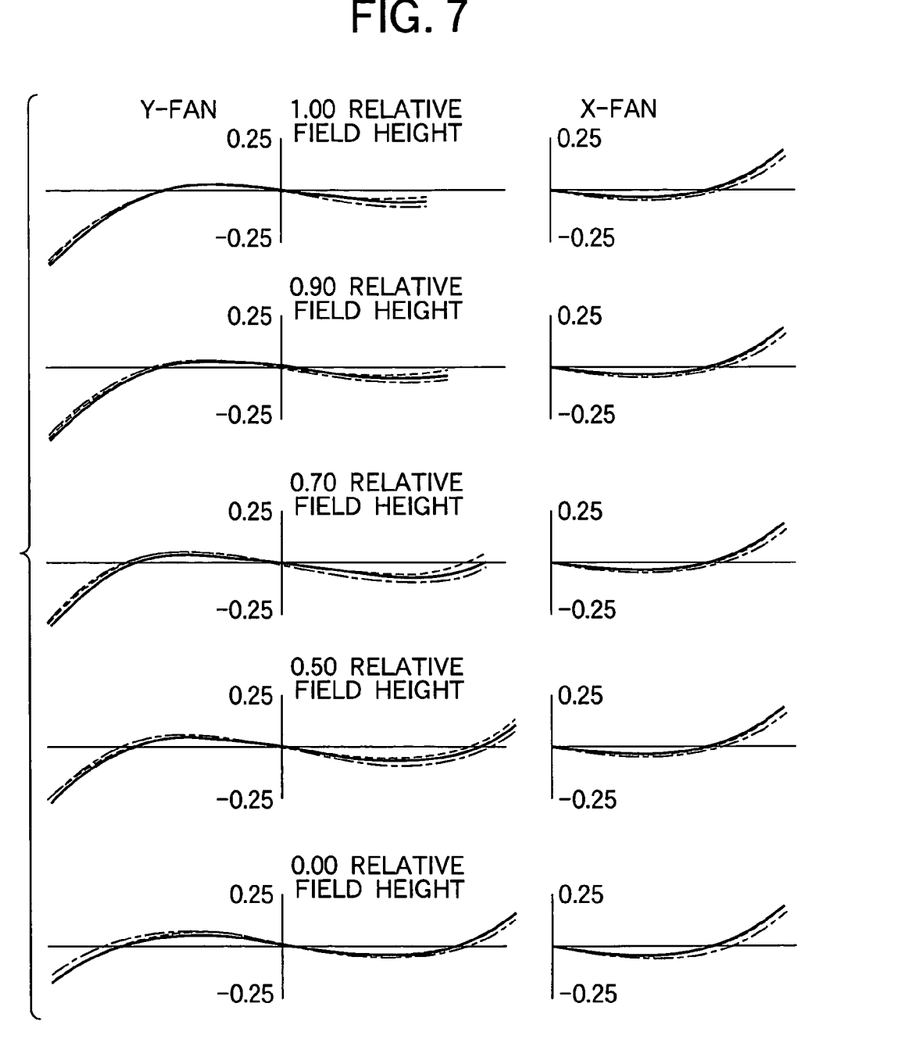
FIG. 7 shows graphs of lateral aberration of the zoom optical system of the embodiment (numerical embodiment)

A lateral aberration in the focal length of 78.8093 mm of the above numerical embodiment is shown in FIG. 5. Furthermore, a lateral aberration in the focal length of 97.5481 mm is shown in FIG. 6, and a lateral aberration in the focal length of 116.2877 mm is shown in FIG. 7. In these lateral aberrations, the horizontal axis is an X or Y axis on the pupil surface, and the longitudinal axis represents the amount of aberration on the image plane. The wavelengths of evaluation light beams are 620 nm (red R), 550 nm (green G) and 470 nm (blue B). From these figures, it is apparent that an image is satisfactorily formed in each axis direction.

According to this embodiment, a zoom optical system which is excellent in a telecentric characteristic on the object side and excellent in invariance of the positions of the object surface, the image plane and the exit pupil against variations in the focal length while providing sufficient space (back focus) for inserting a color synthesizing element and the like can be achieved.

Thus, if the zoom optical system of this embodiment is disposed on the object surface side (liquid crystal display panel, etc.) in the projecting optical system, a projecting optical system and an image projecting apparatus having a low degree of sensitivity to production errors and having a wide view angle while having an increased movement of the image plane with the aberration satisfactorily corrected can be achieved.

In this embodiment, a zoom optical system in which the exit pupil diameter is different for the Y axis direction and the X axis direction has been described, but the present invention may also be applied for a zoom optical system having an exit pupil of which the diameter is the same for both the directions.

Here, the present invention is applicable also to a magnification length measuring machine.

In the above-mentioned embodiment, a zoom optical system in which the reduction side is the object side and the magnification side is the image side has been described, but the present invention may also be applied to a zoom optical system in which the magnification side is the object side and the reduction side is the image side. The present invention can also be applied to, for example, an exposure apparatus (the size of an image is not changed even if the focus position of the object on the reduction side is slightly shifted if the reduction side is telecentric), and a compact image pickup lens having a front stop (having a stop disposed on the magnification side of the zoom optical system).

According to this embodiment, a zoom optical system which is a bright optical system providing a sufficient back focus and having a large numerical aperture, wherein further the optical system is excellent in a telecentric characteristic on the object side, excellent in invariance of the positions of the object surface, the image plane and the exit pupil against variations in the focal length, and compact can be achieved.

This application claims priority from Japanese Patent Application No. 2004-261718 filed on Sep. 8, 2004, which is hereby incorporated by reference herein.

What is claimed is:
1. A zoom optical system comprising, in order from reduction conjugate side to magnification conjugate side:
   a first lens unit having a positive optical power;
   a second lens unit having a negative optical power;
   a third lens unit having a positive optical power; and
   a fourth lens unit having a negative optical power,
   wherein in an entire zoom range, a magnification-side conjugate position relative to a reduction-side conjugate position, and the position of a magnification con- jugate side exit pupil of the zoom optical system relative to the reduction-side conjugate position are each substantially fixed, the interval between the first lens unit and the second lens unit at a telephoto end is larger than the interval between the first lens unit and the second lens unit at a wide-angle end, the interval between the second lens unit and the third lens unit at the telephoto end is larger than the interval between the second lens unit and the third lens unit at the wide-angle end, and the interval between the third lens unit and the fourth lens unit at the telephoto end is smaller than the interval between the third lens unit and the fourth lens unit at the wide-angle end.

2. The optical system according to claim 1, wherein said pupil disposed outside said zoom optical system.

3. The optical system according to claim 1, wherein in said entire zoom range, an optical power obtained by synthesizing said first lens unit and said second lens unit, an optical al power obtained by synthesizing said second lens unit and said third lens unit, and an optical power obtained by synthesizing said third lens unit and said fourth lens unit are a positive.

4. The optical system according to claim 1, wherein a substantially flat image at said reduction-side conjugate position is formed on a curved surface at said magnification-side conjugate position.

5. The optical system according to claim 1, wherein the optical system is substantially telecentric in said reduction conjugate side, and in said entire zoom range, the distance between an image side principal point and said pupil is substantially equal to the focal length of said zoom optical system.

6. The optical system according to claim 1, wherein in said entire zoom range, a distance between a reduction conjugate side principal point and a magnification conjugate side principal point is substantially equal to E-fz-fz(x'+fz)/x', where E represents a distance between said reduction-side conjugate position and said magnification-side conjugate position, fz represents a focal length of the zoom optical system, and x' represents a distance between said pupil and said magnification-side conjugate position.

7. The optical system according to claim 1, wherein in said entire zoom range, a distance between said fourth lens unit and said pupil longer than ½ of the minimum diameter of the pupil.

8. A projecting optical system comprising: the zoom optical system according to claim 1, wherein a light beam from an original disposed at said reduction conjugate position is projected onto a surface to be projected.

9. A projecting optical system comprising:

a zoom optical system which includes, in order from reduction conjugate side to magnification conjugate side:

a first lens unit having a positive optical power;

a second lens unit having a negative optical power;

a third lens unit having a positive optical power; and a fourth lens unit having a negative optical power, wherein in an entire zoom range, a magnification-side conjugate position relative to a reduction-side conjugate position, and the position of a pupil of the zoom optical system relative to the reduction-side conjugate position are each substantially fixed, and the interval between the first lens unit and the second lens unit at a telephoto end is larger than the interval between the first lens unit and the second lens unit at a wide-angle end, the interval between the second lens unit and the third lens unit at the telephoto end is larger than the interval between the second lens unit and the third lens unit at the wide-angle end, and the interval between the third lens unit and the fourth lens unit at the telephoto end is smaller than the interval between the third lens unit and the fourth lens unit at the wide-angle end, a reflecting member substantially disposed at the position of said pupil and reflecting light from the zoom optical system; and a reflecting optical system including a plurality of reflecting surfaces successively reflecting light from the reflecting member, wherein a light beam incident to said zoom optical system from an original disposed at said reduction conjugate position is projected onto a surface to be projected by said reflecting optical system, and said reflecting member rotates, whereby the projected image projected onto said surface to be projected moves on said surface to be projected.

10. The projecting optical system according to claim 9, wherein said reflecting optical system includes a plurality of non-rotational symmetrical reflecting surfaces.

11. The projecting optical system according to claim 9, wherein an intermediate image of said original is formed in said reflecting optical system.

12. The projecting optical system according to claim 9, further comprising: at least one refractive optical element disposed between said reflecting optical system and said surface to be projected.

13. The projecting optical system according to claim 12, wherein said at least one refractive optical element includes a cemented lens formed by a positive lens and a negative lens.

14. An image projecting apparatus comprising: the projecting optical system according to claim 9; and an image forming element forming said original.

15. The image projecting apparatus according to claim 14, wherein in said entire zoom range, the distance between said reduction-side conjugate position and said first lens unit is equal to or more than three times as large as the maximum image height of said original.

16. An image projecting system comprising: the image projecting apparatus according to claim 14; and an image information providing apparatus for providing image information for forming said original to said image projecting apparatus.

17. An optical apparatus comprising the zoom optical system according to claim 1.

18. A projecting optical system according to claim 9, wherein the pupil of the zoom optical system is an exit pupil of the zoom optical system.

19. A zoom optical system comprising, in order from reduction conjugate side to magnification conjugate side:

a first lens unit having a positive optical power;

a second lens unit having a negative optical power;

a third lens unit having a positive optical power; and a fourth lens unit having a negative optical power, wherein in an entire zoom range, a magnification-side conjugate position relative to a reduction-side conjugate position, and the position of a pupil of the zoom optical system relative to the reduction-side conjugate position are each substantially fixed, the interval between the first lens unit and the second lens unit at a telephoto end is larger than the interval between the first lens unit and the second lens unit at a wide-angle end, the interval between the second lens unit and the third lens unit at the telephoto end is larger than the interval between the second lens unit and the third lens unit at the wide-angle end; and the interval between the third lens unit and the fourth lens unit at the telephoto end is smaller than the interval between the third lens unit and the fourth lens unit at the wide-angle end, and the pupil disposed outside the zoom optical system and is disposed on the magnification conjugate side of the zoom optical system.

20. An image projection apparatus, comprising:
an image forming element for forming an original; and
a zoom optical system according to claim 19, for magnifying and projecting the original.

21. A zoom optical system comprising, in order from reduction conjugate side to magnification conjugate side:
a first lens unit having a positive optical power;
a second lens unit having a negative optical power;
a third lens unit having a positive optical power; and
a fourth lens unit having a negative optical power,
wherein in an entire zoom range, a magnification-side conjugate position relative to a reduction-side conjugate position, and the position of a pupil of the zoom optical system relative to the reduction-side conjugate position are each substantially fixed, the interval between the first lens unit and the second lens unit at a telephoto end is larger than the interval between the first lens unit and the second lens unit at a wide-angle end, the interval between the second lens unit and the third lens unit at the telephoto end is larger than the interval between the second lens unit and the third lens unit at the wide-angle end, the interval between the third lens unit and the fourth lens unit at the telephoto end is smaller than the interval between the third lens unit and the fourth lens unit at the wide-angle end, and a substantially flat image at the reduction-side conjugate position is formed on a curved surface at the magnification-side conjugate position.

22. An image projection apparatus, comprising: an image forming element for forming an original; and
a zoom optical system according to claim 21, for magnifying and projecting the original.

23. A zoom optical system comprising, in order from reduction conjugate side to magnification conjugate side:
a first lens unit having a positive optical power;
a second lens unit having a negative optical power;
a third lens unit having a positive optical power; and
a fourth lens unit having a negative optical power,
wherein in an entire zoom range, a magnification-side conjugate position relative to a reduction-side conjugate position, and the position of a pupil of the zoom optical system relative to the reduction-side conjugate position are each substantially fixed, the interval between the first lens unit and the second lens unit at a telephoto end is larger than the interval between the first lens unit and the second lens unit at a wide-angle end, the interval between the second lens unit and the third lens unit at the telephoto end is larger than the interval between the second lens unit and the third lens unit at the wide-angle end; and the interval between the third lens unit and the fourth lens unit at the telephoto end is smaller than the interval between the third lens unit and the fourth lens unit at the wide-angle end, and the optical system is substantially telecentric in the reduction conjugate side, and in the entire zoom range, the distance between an image side principal point and the pupil is substantially equal to the focal length of the zoom optical system.

24. An image projection apparatus, comprising:
an image forming element for forming an original; and
a zoom optical system according to claim 23, for magnifying and projecting the original.

25. A zoom optical system comprising, in order from reduction conjugate side to magnification conjugate side:
a first lens unit having a positive optical power;
a second lens unit having a negative optical power;
a third lens unit having a positive optical power; and
a fourth lens unit having a negative optical power,
wherein in an entire zoom range, a magnification-side conjugate position relative to a reduction-side conjugate position, and the position of a pupil of the zoom optical system relative to the reduction-side conjugate position are each substantially fixed, the interval between the first lens unit and the second lens unit at a telephoto end is larger than the interval between the first lens unit and the second lens unit at a wide-angle end, the interval between the second lens unit and the third lens unit at the telephoto end is larger than the interval between the second lens unit and the third lens unit at the wide-angle end; and the interval between the third lens unit and the fourth lens unit at the telephoto end is smaller than the interval between the third lens unit and the fourth lens unit at the wide-angle end, and in the entire zoom range, a distance between a reduction conjugate side principal point and a magnification conjugate side principal point is substantially equal to $E - fz - fz(x'+fz)/x'$, where E represents a distance between the reduction-side conjugate position and the magnification-side conjugate position, fz represents a focal length of the zoom optical system, and x' represents a distance between the pupil and the magnification-side conjugate position.

26. An image projection apparatus, comprising:
an image forming element for forming an original; and
a zoom optical system according to claim 25, for magnifying and projecting the original.

* * * * *

UNITED STATES PATENT AND TRADEMARK OFFICE
CERTIFICATE OF CORRECTION

PATENT NO. : 7,298,560 B2  Page 1 of 1
APPLICATION NO. : 11/222723
DATED : November 20, 2007
INVENTOR(S) : Hatakeyama It is certified that error appears in the above-identified patent and that said Letters Patent is hereby corrected as shown below:

In Column 15, Line 21, delete "al"; and

Line 24, change "a" to --all--.

Signed and Sealed this

Eighth Day of April, 2008

JON W. DUDAS
*Director of the United States Patent and Trademark Office*